(No Model.) 7 Sheets—Sheet 1.
F. B. FREMEREY.
MACHINE FOR DECORTICATING JUTE, RAMIE, AND OTHER FIBROUS PLANTS.
No. 472,988. Patented Apr. 19, 1892.
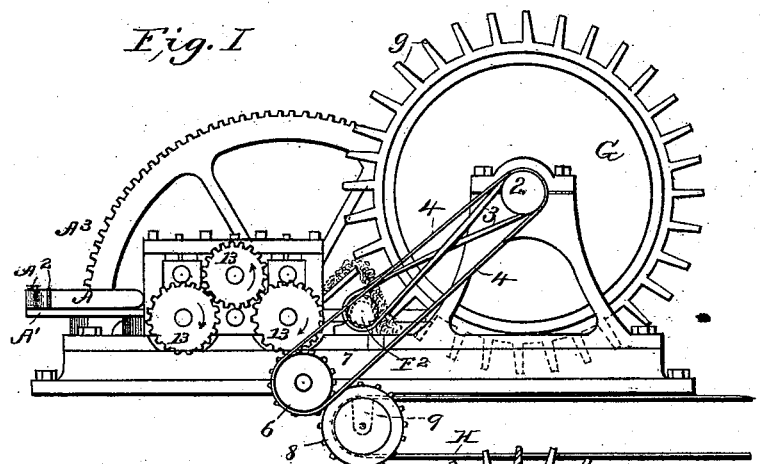
Fig. I.
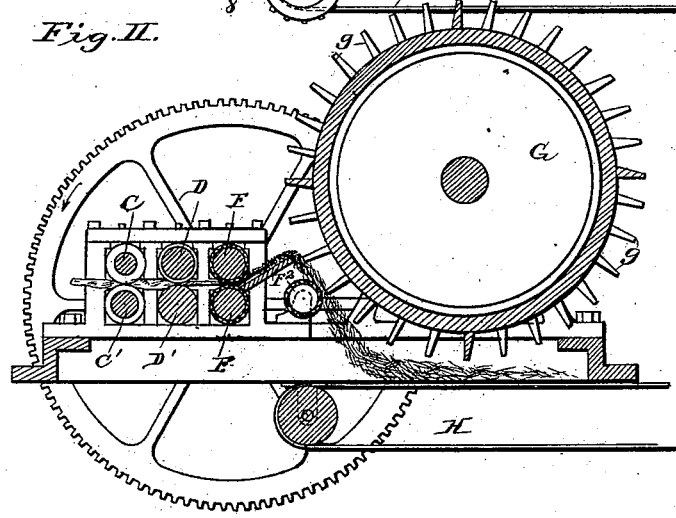
Fig. II.
Witnesses:
Harry B. Rohrer
F. A. Hopkins
Inventor:
Felix B. Fremerey,
By Knight Bros.
Attorneys (No Model.)  F. B. FREMEREY.  7 Sheets—Sheet 2.
MACHINE FOR DECORTICATING JUTE, RAMIE, AND OTHER FIBROUS PLANTS.
No. 472,988.  Patented Apr. 19, 1892.
Fig. III.
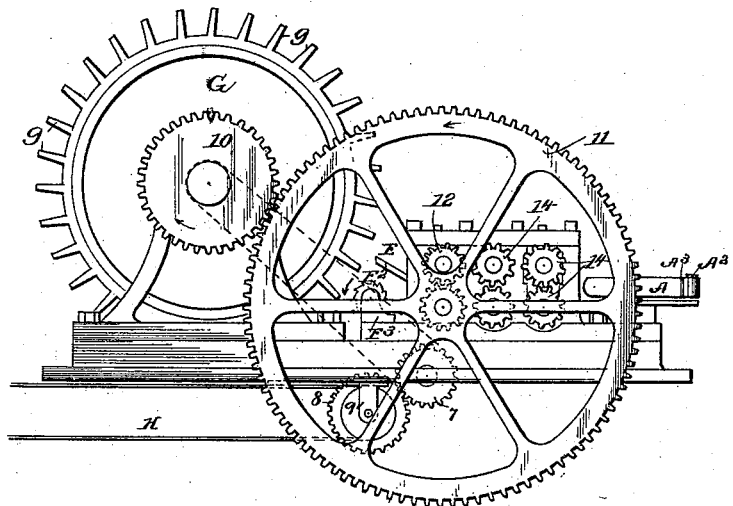
Fig. IV.
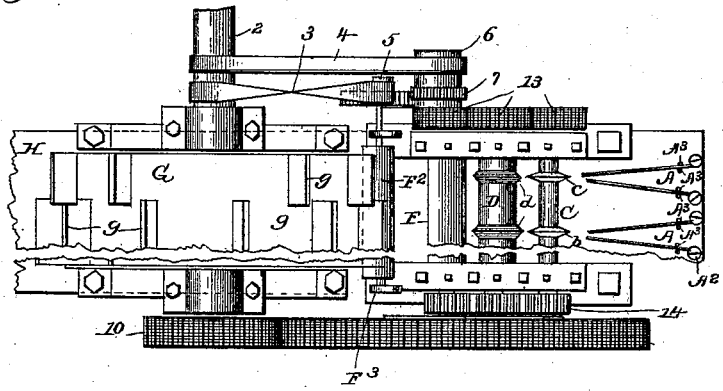
Witnesses:
Harry D. Rohrer
F. A. Hopkins
Inventor:
Felix B. Fremerey
By Knight Bros.
Attys.

(No Model.) 7 Sheets—Sheet 3.
F. B. FREMEREY.
MACHINE FOR DECORTICATING JUTE, RAMIE, AND OTHER FIBROUS PLANTS.
No. 472,988. Patented Apr. 19, 1892.
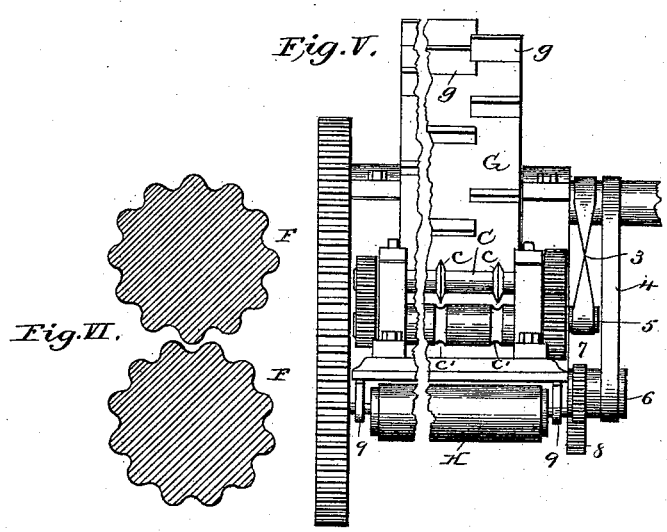
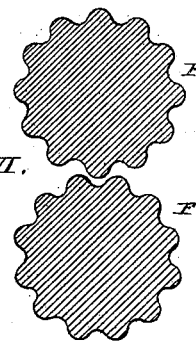

(No Model.) 7 Sheets—Sheet 4.
F. B. FREMEREY.
MACHINE FOR DECORTICATING JUTE, RAMIE, AND OTHER FIBROUS PLANTS.
No. 472,988. Patented Apr. 19, 1892.
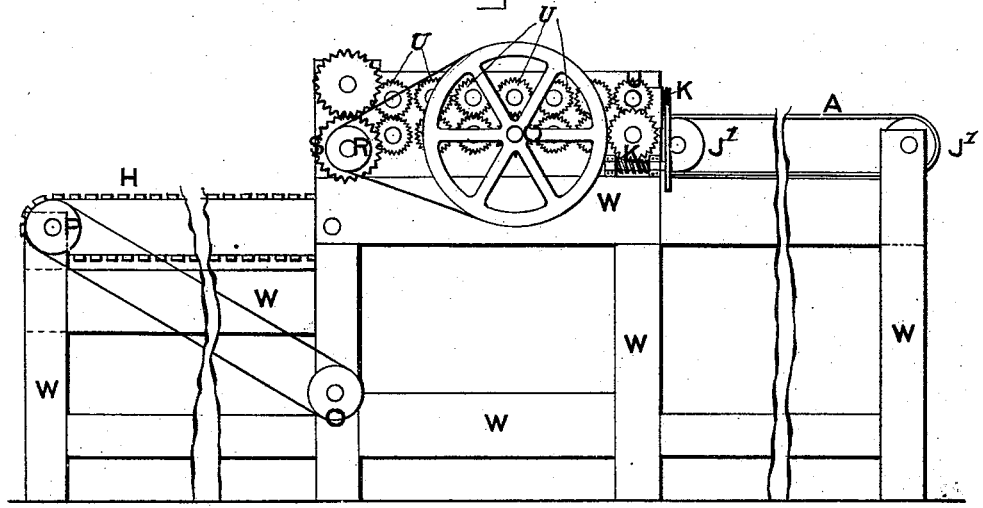
Fig. VIII.
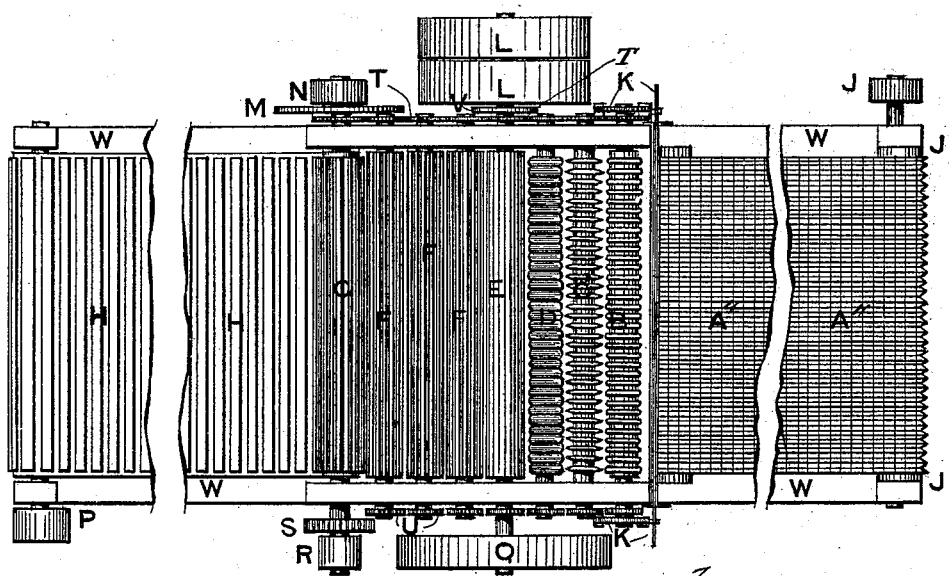
Fig. IX.
Witnesses:
C. E. Angell
John W. Stowe
Inventor
Felix B. Fremerey (No Model.)  7 Sheets—Sheet 5.
F. B. FREMEREY.
MACHINE FOR DECORTICATING JUTE, RAMIE, AND OTHER FIBROUS PLANTS.
No. 472,988.  Patented Apr. 19, 1892.
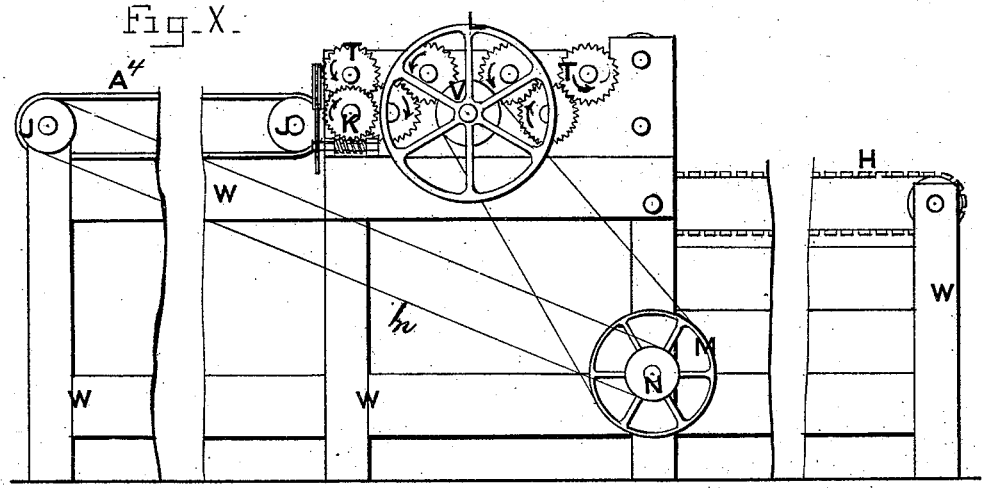
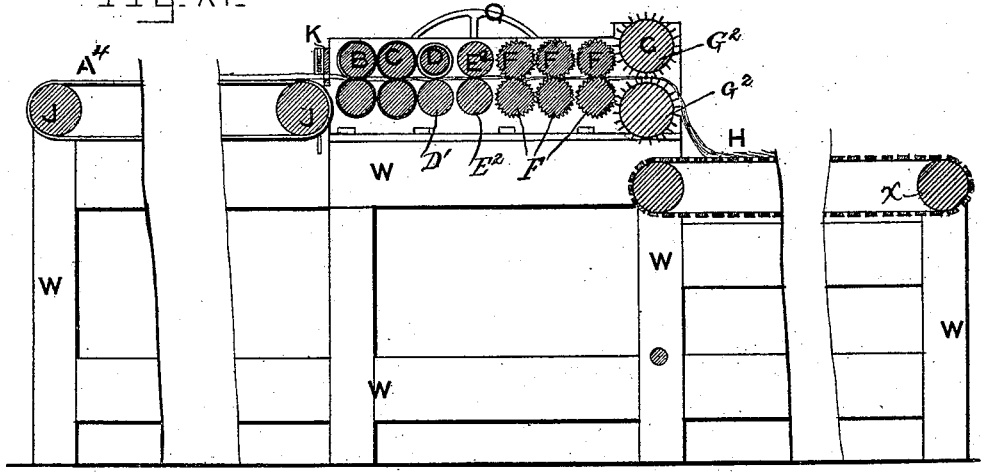

(No Model.) 7 Sheets—Sheet 6.
F. B. FREMEREY.
MACHINE FOR DECORTICATING JUTE, RAMIE, AND OTHER FIBROUS PLANTS.
No. 472,988. Patented Apr. 19, 1892.
Fig. XII.
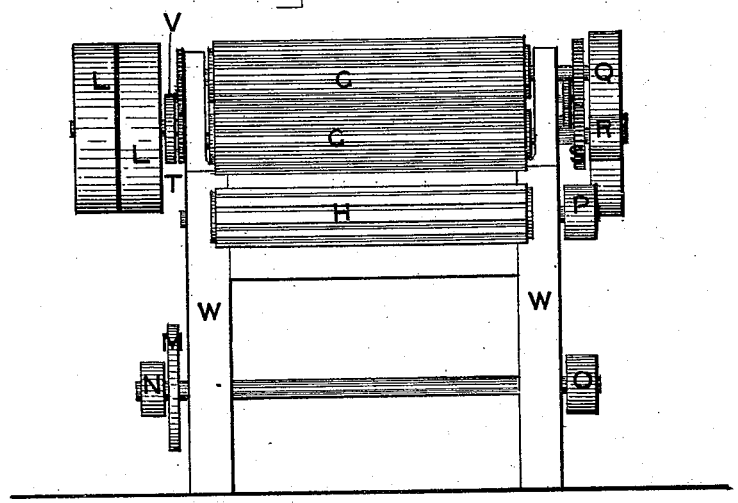
Fig. XIII.
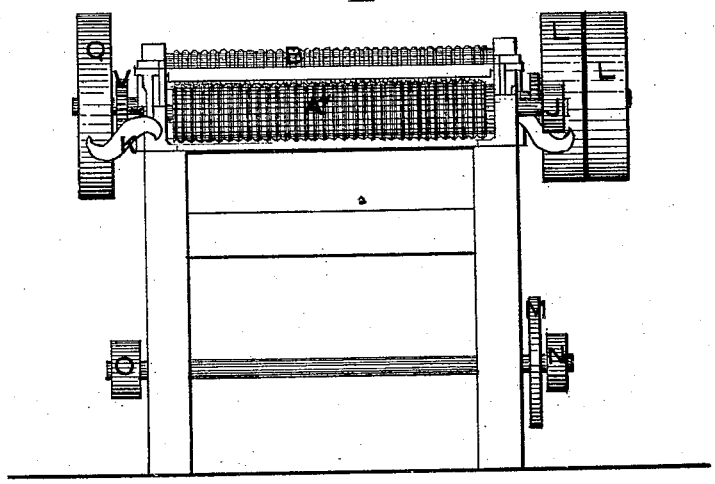

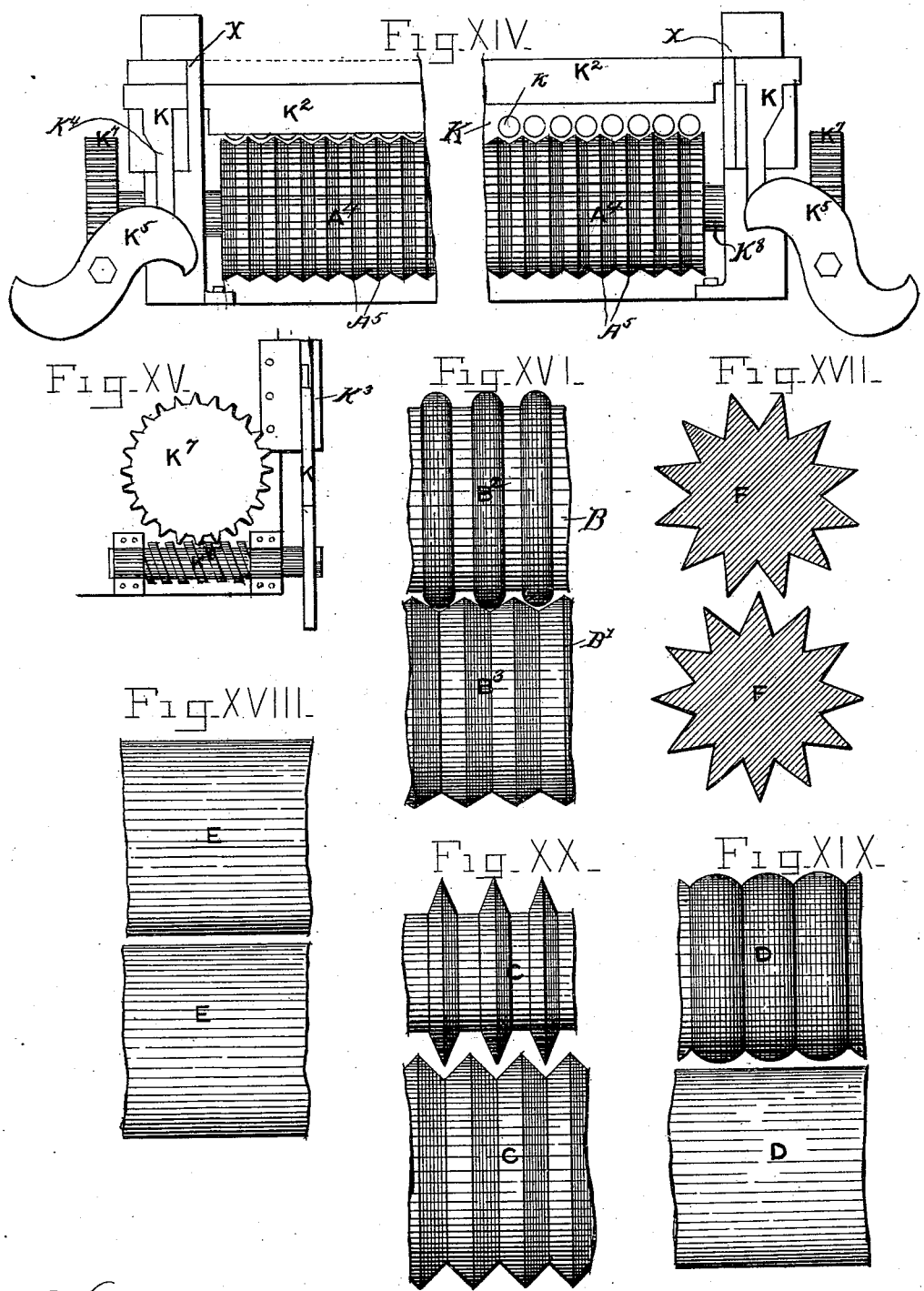

UNITED STATES PATENT OFFICE.

FELIX B. FREMEREY, OF GALVESTON, TEXAS.

MACHINE FOR DECORTICATING JUTE, RAMIE, AND OTHER FIBROUS PLANTS.

SPECIFICATION forming part of Letters Patent No. 472,988, dated April 19, 1892.

Application filed May 29, 1891. Serial No. 394,615. (No model.)

*To all whom it may concern:*

Be it known that I, FELIX BERNHARD FREMEREY, a citizen of the Kingdom of Holland, residing at Galveston, in the county of Galveston and State of Texas, have invented certain new and useful Improvements in Machines for Decorticating Jute, Ramie, and other Fibrous Plants, of which the following is a specification.

The subject of my invention is a machine for separating the valuable fibrous portions of the stems of the plants of the jute, ramie, flax, and hemp, and like varieties from refuse matter and preparing the same for use with the least possible injury and waste. Machines heretofore in use for this purpose are defective in that they do not readily and successfully separate the refuse from the valuable fiber and the fiber itself is broken and cut transversely to a greater or less extent, the broken woody fragments being crushed through the bark of the fibrous portions, by which a great part of the valuable fiber is spoiled and wasted. Such machines, moreover, require a high motive power, and hence are very expensive in use.

In order to produce a machine adapted for general use by farmers who follow the industry of raising ramie, flax, hemp, and other fibrous plants, such a machine must be of moderate cost, light and portable, simple in construction, and adapted to operate with speed and economy.

In my improved machine the stalks are introduced between guides, by which they are directed between rollers, the upper one of which is furnished with any desirable number of rotary cutters adapted to slit the stalks open longitudinally and the lower one with grooves turned in its periphery to prevent the stalks from slipping to either side of the knives, after which they pass between flattening or spreading rollers, which open out and flatten the split stalks. The flattened stalks are then passed between fluted rollers adapted to break the pith of the stalks into fragments and to loosen the epidermis of the outside bark, and then the broken and crushed stalks pass onward to beaters, which beat off the woody fragments, the fiber thus treated being conveyed away from the machine by an endless carrier to any suitable degumming apparatus. (Not shown.)

In order that my invention may be fully understood, I will proceed to describe it in detail with reference to the accompanying drawings, wherein like signs of reference refer to like parts throughout the several views, and in which—

Figure I is a side elevation of the machine. Fig. II is a vertical transverse section of the same. Fig. III is an elevation from the opposite side from that shown in Fig. I. Fig. IV is a plan or top view. Fig. V is a front view. Figs. VI and VII are enlarged detail views of the corrugated rollers and of the toothed guide-roller, respectively, hereinafter described. Figs. VIII to XX, inclusive, illustrate the preferred form of my invention, Fig. VIII being a side elevation; Fig. IX, a plan view; Fig. X, an elevation of the side opposite to that shown in Fig. VII; Fig. XI, a vertical longitudinal section; Fig. XII, a rear elevation, and Fig. XIII a front elevation, of the complete machine, and Figs. XIV and XV being, respectively, an enlarged front and edge elevation of the gate or stripper hereinafter described; Figs. XVI and XVII, a side elevation and cross-section of the feeding and corrugated breaking rollers, respectively, on an enlarged scale; and Figs. XVIII, XIX, and XX, enlarged side elevations of the spreading and slitting rollers.

A A represent pairs of steel springs, which constitute the guides. Any desirable number of these paired springs may be mounted in front of the machine in such a position that the stalks of jute, ramie, or other fibrous plants may be introduced between them, and will be thereby guided in a straight longitudinal position, so as to be slit lengthwise by the revolving cutter-rollers C C'. The upper roller C of this pair has one or more circumferential cutters *c*, equal in number to the paired guide-springs A and directly in line of the throat formed by said paired springs, while the lower roller C' of the pair is formed with a corresponding number of circumferential grooves *c'* directly beneath the cutters *c*, as shown in Figs. V and XX. The grooves *c'* serve to keep the stalks in position, while the cutters *c* split them partially through to adapt them to be spread open. The spreading and flattening of the stalks are effected by the second pair of rollers D D', the upper one D of which is furnished with angular circumferential ridges $d$ to engage in the split or opening formed by the cutters $c$ and spread and flatten the split stalks against the lower roller D', which has a smooth cylindrical surface.

F F represent a pair of fluted rollers, which receive the split and flattened stalks from the spreading-rollers D D' and serve to break their woody portions into fragments and loosen the epidermis of the outside bark. The crushed stalks are then carried over a guide-bar E, which is an inclined flat plate of iron or steel placed in suitable position to receive the crushed stalks and hold them against the action of the beaters. The beaters consist of a series of blades $g$, with which a revolving cylinder G is armed and which project nearly radially therefrom and are adapted to act upon the woody side of the crushed stalks, so as to effectually beat the woody fragments off from the fibrous ribbons. These are then caught by a toothed guide-roller $F^2$ and discharged on the endless carrying-apron H and thereby delivered to any desired point. The woody fragments drop on the same endless apron, from the end of which they fall to the ground to be used as fertilizer or fuel. This guide-roller $F^2$ in cross-section has the form of an ordinary ratchet-wheel, so that its surface will be more effective in propelling material onto the apron, and it is journaled in brackets or standards $F^3$ at each end and mounted upon the main frame of the machine.

The machine is driven by power transmitted in any suitable manner to the main shaft 2, upon which the drum G is mounted. Passing around this shaft at one side of the machine are belts 3 4, the former passing around a band-wheel 5 on the shaft of the roller F, while the latter passes around a band-wheel 6, which carries at the inner side a pinion 7. This pinion engages with a pinion 8 on the end of the shaft that carries the endless belt or apron H, and thus imparts to the latter the desired motion, the shaft of the endless belt or apron being mounted in hangers 9, suitably suspended from the main frame. At the opposite side of the machine upon this shaft is a gear-wheel 10, which engages with a larger gear-wheel 11, keyed to the end of the shaft of the lower roller F and having a pinion (shown in dotted lines in Fig. 3) engaging with a pinion 12 on the end of the upper roller F. At the opposite side to this the lower rollers of the end pairs and the upper rollers of the middle pair are geared together by means of pinions 13, whereby the revolutions of the bottom roller F will be transmitted to one roller of each of the other pairs, they being geared together in pairs by means of pinions 14. As the shaft 2 is revolving in the opposite direction to that in which it is necessary for the roller $F^2$ to revolve, it is of course essential to reverse the motion of the belt 3 before it reaches the pulley of the roller $F^2$, which is done by taking a twist in the belt, as shown.

The course of the stock through the machine is as follows: After having passed between the guide-springs it is caught by the splitting-rolls and sliced open, whereupon it is first spread open by the spreading-rolls and then crimped or broken by the breaking-rolls. The rolls now having a firm hold on the stalk propel it on over the guide-plate E within reach of the blades of the drum G, which beat out the woody fiber. The fiber now having lost its rigidity has a tendency to fall back under the plate E out of the reach of the beating-blades; but the roller $F^2$, with its teeth projecting and revolving toward the drum G, being interposed so as to catch the fiber, causes it to advance still farther within the reach of the blades, and finally allows the thoroughly-beaten fiber to fall onto the endless conveyer-apron and be delivered.

Referring now more particularly to the preferred form of my invention represented in Figs. VIII to XX, it will be seen that instead of the fixed guides and feed-table of the form just described I employ an endless traveling table $A^4$, having formed thereon longitudinal ridges or ribs $A^5$, which constitute guides for directing the stalks in a longitudinal direction into the machine. This endless feed-table may be composed in any desired and well-known way, preferably, however, by using a number of metallic transversely-corrugated or ribbed laths secured to a suitable belt or belts.

Arranged at the inner end of the table $A^4$, transversely thereof, is a partition or wall K, having a number of apertures $k$, coinciding with the channels or grooves formed by the guide-ribs $A^5$. The ribs $A^5$ constitute guides for directing the stalks through the apertures $k$, and the latter serve to guide them to and hold them in proper position for seizure by the feeding-rollers hereinafter described. In front of this wall K is arranged a vertically-sliding gate or plate $K^2$, adapted to descend and nearly cover the apertures $k$, so as to rest on the stalks as they are passing into the machine and strip or scrape off the leaves and tops when the same come in contact therewith. This plate $K^2$ works in vertical ways $K^3$, and has at each end an arm or leg $K^4$, adapted to be impinged at its lower end by an S-shaped lifting-lever $K^5$, by means of which the gate may be elevated. Each of these levers $K^5$ is secured to the end of a worm-shaft $K^6$, with which engages a worm-wheel $K^7$. Thus by rotating or oscillating the levers $K^5$ the gate or plate $K^2$ will be elevated for the admission of the stalks to the apertures $k$.

Just behind the wall K, between it and the cutting-rollers C, is mounted a pair of feeding or gripping rollers B B'. The upper one B of these rollers is provided with a number of bands $B^2$, composed of rubber or some similar yielding substance, and the lower one B' with a corresponding number of peripheral grooves B³, which register with the bands B² and which keep the stalks directly under the said bands and thus feed said stalks forward to the peripheral grooves c' of the roller C', so that they may be cut or slit longitudinally by the peripheral knives c. The stalks then pass onto the spreading-rolls D D', as before described. In this form of the invention, however, a second pair of spreading-rollers E E, having plain surfaces, is provided, which catch the stalks as they leave the rolls D D' and more effectually flatten them. The ribbons of fiber thus produced are next caught by the corrugated breaking-rollers F, which in this instance, however, are provided with corrugations sharper and deeper than those employed in the other form, and of them I prefer to use about three pairs, as shown; but a greater or lesser number may of course be employed without departing from the principle and spirit of my invention. In this form I dispense with guide-plate E and toothed roller F and mount the beaters g on two drums or rollers G², considerably smaller in diameter than the drum G; and arrange said drums in such a position that the ribbons on leaving the last pair of rollers F will be caught by the beaters and thereby freed from the woody particles and finally deposited on the endless conveyer H. The rollers of each pair at one side of the machine are geared together by pinions U, one of which operates a band-wheel Q, connected by a belt with a pulley R on one of the cogs S, by which the drums G² are geared together. On the opposite side of the machine only every alternate roller is provided with a pinion T, which mesh with each other and are rotated in the directions indicated by the arrows by means of the main pulley L, secured to one of said pinions T. On the shaft with pulley L is a pulley V, connected by a belt with a pulley M, and this pulley M is connected by means of a smaller pulley N and belt with a pulley J on the end of one of the rollers J', which carry and drive the feeding apron or table A⁴. On the shaft with the pulleys M N is a pulley O, which is connected by a belt with a pulley P on one of the rollers which carry and drive the conveyer H. In the drawings the belts connecting the various pulleys are omitted in the plan and end views for the sake of clearness. Beside the main pulley L and on the shaft therewith is of course arranged a similar but loose or idle pulley, upon which the driving-belt may be shifted when it is desired to stop the machine.

Having thus described my invention, the following is what I claim as new therein and desire to secure by Letters Patent:

1. The combination, with the feed-table, of the guides on said table and the slitting-rollers, one of said rollers having peripheral cutting-edges and the other peripheral grooves adapted to receive said edges, substantially as set forth.

2. The combination of the feed-table, guides for directing the stalks across said table, slitting-rollers, and spreading-rollers, substantially as and for the purpose set forth.

3. The combination, with the slitting-rollers and spreading-rollers, of fluted crushing or breaking rollers and the beaters, substantially as and for the purpose set forth.

4. The combination of the feed-table, guides for directing the stalks across said table, feeding-rollers for receiving the stalks from said guides, and the slitting and spreading rollers, substantially as set forth.

5. The combination, with the feed-table and the slitting-rollers, of the feeding-rollers having yielding peripheral bands and guides for directing the stalks to said feed-rollers, substantially as set forth.

6. The combination, with the feed-table and the slitting-rollers, of the feeding-rollers, one of which is provided with peripheral bands and the other with corresponding grooves, substantially as set forth.

7. The combination of the traveling feed-table, the slitting and spreading rollers, and guides for directing the stalks to said rollers, substantially as set forth.

8. The combination of the traveling feed-table having guide-ribs, the feed-rollers having peripheral grooves and bands coinciding with the grooves formed by said ribs, and the slitting and spreading rollers, substantially as set forth.

9. The combination, with the feed-table and the slitting and spreading rollers, of a stripper arranged athwart said table in advance of said rollers, substantially as set forth.

10. The combination, with the feed-table and the slitting and spreading rollers, of the perforated partition and rising-and-falling plate arranged athwart said table in advance of the said rollers, substantially as set forth.

11. The combination of the feed-table having guide-ribs, the rising-and-falling plate K², and the feed-rollers adapted to drag the stalks under the said plate, substantially as set forth.

12. The combination, with the feed-table and feeding-rollers, of the rising-and-falling plate and the rotary S-shaped levers for elevating said plate, substantially as set forth.

13. The combination of the feed-table having guides, the slitting-rollers, the spreading-rollers D D', one of which has peripheral ribs and the other corresponding grooves, and the succeeding spreading-rollers E, having plain surfaces, substantially as set forth.

14. The combination, with the slitters, spreaders, and breakers, of the revolving drums having beaters g, substantially as set forth.

FELIX B. FREMEREY.

Witnesses:
C. E. ANGELL,
A. KAUFFMAN.